Sept. 5, 1967  M. R. DE TROYA  3,339,476
COFFEE MAKER

Filed Oct. 18, 1965  2 Sheets-Sheet 1

INVENTOR
Michel R. DeTroya
BY
Salvatore G. Militana,
attorney

Sept. 5, 1967  M. R. DE TROYA  3,339,476
COFFEE MAKER

Filed Oct. 18, 1965  2 Sheets-Sheet 2

INVENTOR
Michel R. DeTroya
BY
Salvatore G. Militano
attorney

United States Patent Office 3,339,476
Patented Sept. 5, 1967

3,339,476
COFFEE MAKER
Michel R. De Troya, 138 SE. 14th Lane,
Miami, Fla. 33131
Filed Oct. 18, 1965, Ser. No. 496,940
3 Claims. (Cl. 99—287)

ABSTRACT OF THE DISCLOSURE

A beverage making device for a recptacle having a cover consisting of a spiral blade extending through a slotted opening in the cover, a foraminous beverage container mounted on lower end of the spiral blade within the container, a pair of coaxially mounted tubular members secured to the outer end of the spiral blade, a third tubular member secured to cover and extending upwardly between the pair of tubular members and a spring extending between the cover and one of the pair of tubular members yieldingly forcing the spiral blade in the outermost position whereby upon forcing the spiral blade downwardly through the slotted opening the spiral blade and foraminous beverage container will rotate as they descend in the receptacle.

---

This invention relates generally to a beverage making device and is more particularly directed to a device for making coffee and the like.

A principal object of the present invention is to provide a device for making coffee and the like which maintains the coffee in a foraminous basket out of contact with the water upon heating same to the desired temperature and then spinning the basket in the water until the coffee has been brewed to one's taste.

Another object of the present invention is to provide a coffee making device which does not permit the boiling out of the coffee's flavor during the brewing of the coffee and yet permit the maker of the coffee to make the coffee as strong or dark as is desired.

A further object of the present invention is to provide a coffee making device which is simple in construction, inexpensive in cost and most effective to brew palatable coffee.

A still further object of the present invention is to provide a coffee making machine having a spinning mechanism that is readily actuated to spin a coffee containing foraminous basket in heated water in the brewing of coffee.

With these and other objects in view, the invention will be best understood from a consideration of the following detailed description taken in connection with the accompanying drawings forming a part of this specification, with the understanding, however, that the invention is not confined to any strict conformity with the showing of the drawings but may be changed or modified so long as such changes or modifications mark no material departure from the salient features of the invention as expressed in the appended claims.

Figure 1:
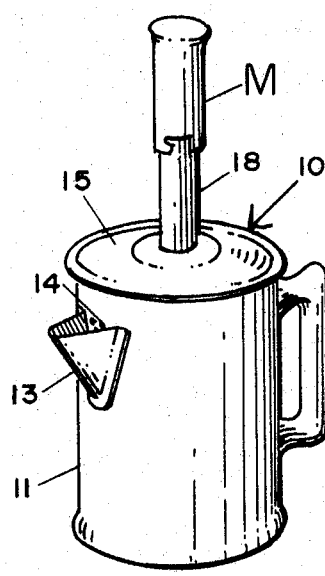
FIGURE 1 is a perspective view of a coffee brewing device constructed in accordance with my invention.

Referring to the drawings wherein like numerals are used to designate similar parts throughout the several views, the numeral 10 refers to my beverage making device consisting of a conventional coffee pot 11 to which a handle 12 is mounted on one side and a spout 13 on the other with openings 14 to permit the liquid contained in the pot 11 to be dispensed therefrom. Mounted on the coffee pot 11 is a cover at the mid-portion of which is an opening 16 for receiving the basket supporting and spinning mechanism M that constitutes the essence of my invention.

Received by the opening 16 in the cover 15 is the lower end portion 17 of a tubular member 18. The tubular member 18 is held securely in position on the cover 15 by a peripheral shoulder 19 which bears against the top surface of the cover 15 and the end portion 17 which is swedged against the lower surface of the cover 15. Adjacent the lower edge of the end portion 17 of the tubular member 18 a base member 20 extends to the side walls 17 and at its mid-portion there is a slot 21 for receiving an elongated spiral blade 22. A pair of detents or protuberances 23 are mounted on the outside surface of the tubular member 18 in close proximity to the cover 15.

Telescopically mounted about the spiral blade 22 is a coil spring 24 whose lower end abuts against the base member 20 while its upper end engages the lower end of a tubular member 25 which is telescopically positioned within the tubular member 18. The upper end of the tubular member 25 is threaded as at 26 which is received by a threaded recess 27 in a head portion 28 mounted on one end of a tubular member 29. The tubular member 29 is telescopically fitted on the outer surface of the tubular member 18 and is in spaced parallel relation to the tubular member 25. The lower or free end of the tubular member 29 is provided with a pair of T-shaped slots 30 for receiving the detents 23 when it is desired to lock the tubular member 29 in its lowered position against the coil spring pressure 24.

The upper end of the spiral blade 22 is provided with means for securing the blade 22 to the head 28 and consisting of a slotted washer 31 having the slot 32 for receiving the end of the spiral blade 22 and a bore 33 for receiving a lock pin 34.

In assembling the spinning mechanism M described hereinabove, the spiral blade is inserted through the slot 21 of the member 20 and slid upwardly to the position of shoulder members 35 mounted in proximity of the lower end of the spiral blade 22. The spiral blade now extends above the tubular member 18. The coil spring 24 is then positioned within the tubular member 18 and about the spiral blade 22. The tubular member 25 is now slipped over the upper end of the spiral blade 22 resting on the coil spring 24. Then the slotted washer 31 is positioned on the spiral blade 22 and the lock pin 34 inserted in the bore 33. The threaded portion 26 of the tubular member 25 is then threaded tightly in position in the recess 27 of the head 28 of the tubular member 29.

The lower end 36 of the spiral blade 22 supports a cover 37 of a foraminous coffee containing basket 38. The cover 37 is provided with an opening 39 for receiving the end 36 of the spiral blade 22. A washer 40 is positioned about the end 36 engaging the shoulder 35 on one side and the outer surface of the cover 37 on the other side. To secure the end 36 of the spiral blade 22 to the cover 37, a groove 41 is formed in the side walls of the end 36 and a split ring 42 is fitted in the grooves 41 to lock the ring 42 to the spiral blade 22 and bear against the lower surface of the cover 37. A cap 43 is secured at its periphery to the lower surface of the cover 37 covering the end 36 of the spiral blade 22.

The basket 38 is provided with a plurality of openings 44 as is the cover 37 to permit the free flow of water therethrough. Also, the basket 38 is provided with a plurality of detents 45 in close proximity to its upper edge for being received by L-shaped slots 46 when the cover 37 is to be secured to the basket 38.

Figure 2:
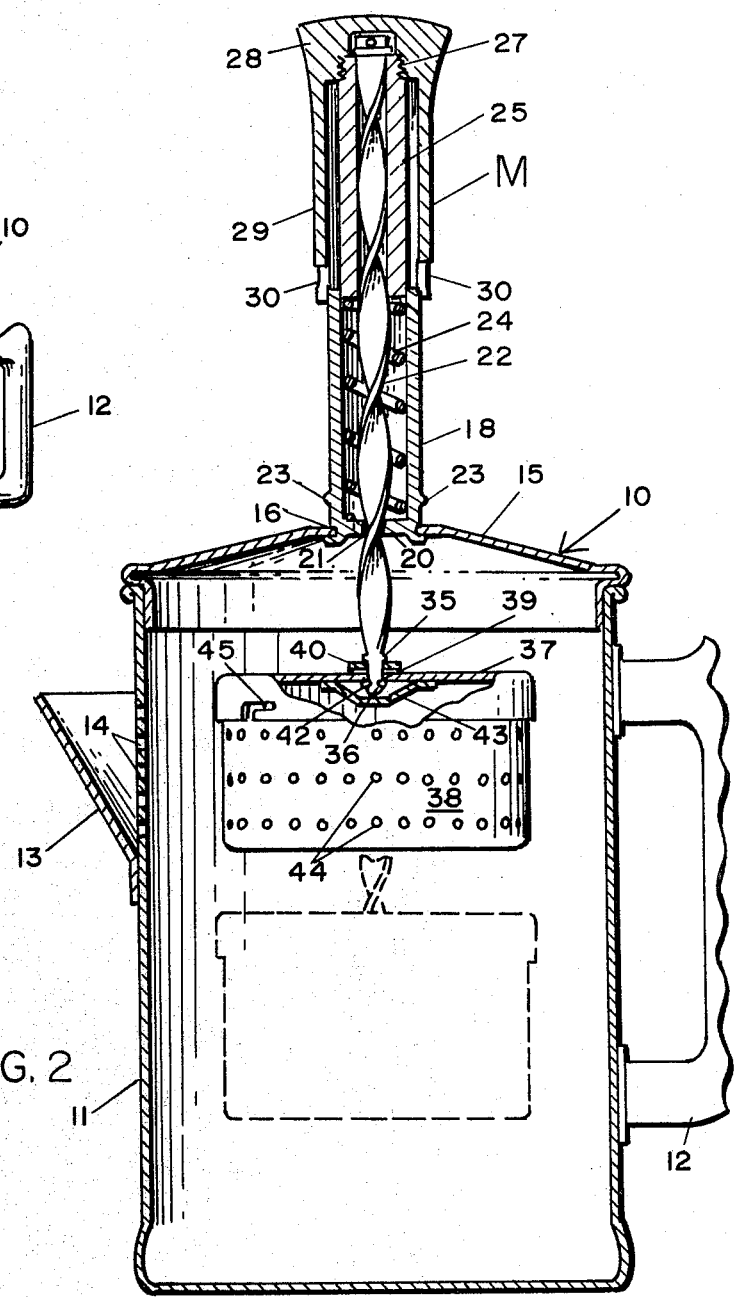
FIGURE 2 is a longitudinal cross sectional view thereof.
Figure 3:
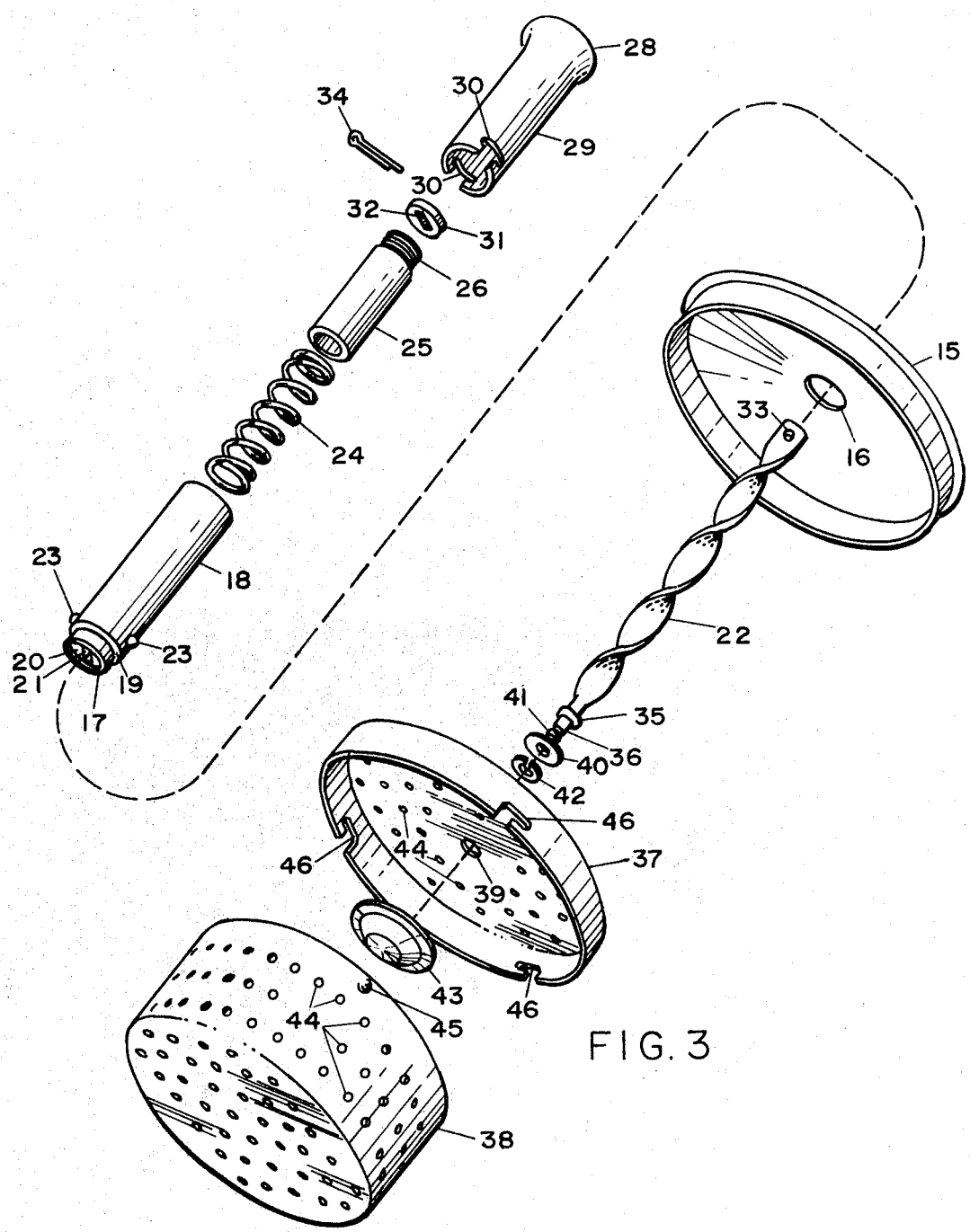
FIGURE 3 is an exploded view of the foraminous basket and the spinning mechanism.

In the normal use of my coffee making device 10, the coffee pot 11 is filled with water to the desired height therein but not higher than the position of the spout openings 14. An appropriate amount of coffee is placed in the foraminous basket 38 which is then secured to the cover 37 and placed within the pot 11 upon positioning the coffee pot cover 15 in place on the pot 11. The basket 38 is positioned above the liquid level in the pot 11 by merely turning the tubular member 29 at the head 28 to release the detent 23 from the slots 30 as the coil spring pressure 24 forces the spiral blade 22 upwardly to the position shown by FIGURE 2.

The water within the pot 11 is then heated to the appropriate temperature which is normally at the boiling point of water at which time the pot 11 is removed from the heat. Upon applying a downward force on the head 28, the spiral blade 22 along with the basket 38 will move downwardly into the body of heated water as the basket 38 is spun by the action of the spiral blade 22 sliding through the slot 21. The momentum of the downward force applied on the head 28 causes the basket 38 to spin freely in the water and permits the water to pass readily through the openings 44 to brew the coffee. When the basket 38 has stopped spinning, the head 28 is released and the coil spring 24 will force the head 28 upwardly carrying the basket 38 to its upward position out of the body of liquid in the pot 11. Again and again the head 28 is forced downwardly to spin the basket 38 within the water until the coffee has been brewed to suit the taste of the maker. In the matter of a few moments of spinning the basket 38, the coffee will be brewed without boiling out the aroma of the coffee as occurs in the conventional manner of making coffee nor absorbing the oils and other distasteful constituents of the coffee bean.

When the coffee making device 10 is not in use the tubular member 29 is locked in its lowered position upon the detents 23 being received in the slots 30.

Having disclosed my invention, what I claim as new and desire to secure by Letters Patent of the United States is:

1. In a coffee maker having a receptacle and a cover for said receptacle, the combination comprising a first tubular member mounted on said cover, a second tubular member telescopically mounted on said first tubular member and normally extending upwardly beyond the free end of said first tubular member, elongated spinning means secured at one end to said second tubular member and extending through said cover into said receptacle, means cooperatively engaging said elongated spinning means upon the sliding of said spinning means downwardly into said receptacle causing said spinning means to revolve, beverage containing means mounted on the lower end of said elongated spinning means within said receptacle and spring means yieldingly urging said second tubular member in its extended position whereby upon said second tubular member being forced to slide downwardly on said first tubular member to its retracted position, said elongated spinning means and said coffee containing means are simultaneously spun and lowered in said receptacle.

2. In a coffee maker having a receptacle, a cover for said receptacle, and said cover having an opening, the combination comprising a first tubular member mounted on said cover at said opening, slotted means mounted on said cover in said tubular member, a second tubular member telescopically mounted on the outer surface of said first tubular member and normally extending upwardly beyond the free end of said first tubular member, a third tubular member telescopically mounted on the inner surface of said first tubular member, an elongated spiral blade mounted in said tubular member having its lower end extending through said slotted portion and terminating in the upper portion of said receptacle, means securing the upper end of said elongated spiral blade and either of said second or third tubular members, beverage containing means mounted on the lower end of said elongated spiral blade and a coil spring mounted about said spiral blade and extending between said slotted means and said third tubular member yieldingly urging said second and third tubular members to their extended position whereby upon forcing said second tubular member downwardly along said first tubular member said elongated spiral member and said beverage containing means are simultaneously rotated and lowered in said receptacle.

3. In a coffee maker having a receptacle, a cover for said receptacle, and said cover having an opening, the combination comprising a first tubular member mounted on said cover at said opening, slotted means mounted on said cover in said tubular member, a second tubular member telescopically mounted on the outer surface of said first tubular member and normally extending upwardly beyond the free end of said first tubular member, a third tubular member telescopically mounted on the inner surface of said first tubular member, an elongated spiral blade mounted in said tubular member having its lower end extending through said slotted portion and terminating in the upper portion of said receptacle, means securing the upper end of said elongated spiral blade and either of said second or third tubular members, cover means mounted on the lower end of said elongated spiral blade, a foraminous beverage container removably secured to said cover and a coil spring mounted about said spiral blade and extending between said slotted means and said third tubular member yieldingly urging said second and third tubular members to their extended position whereby upon forcing said second tubular member downwardly along said first tubular member said elongated spiral member and said beverage container are simultaneously spun and lowered in said receptacle.

References Cited
UNITED STATES PATENTS

| | | | |
|---|---|---|---|
| 476,851 | 6/1892 | Williams | 99—319 |
| 1,068,450 | 7/1913 | Roberts | 259—124 X |
| 1,636,727 | 7/1927 | Willner | 99—319 |
| 2,631,522 | 3/1953 | Joy | 99—287 |
| 2,631,826 | 3/1953 | Wolf | 74—89.15 X |
| 3,040,356 | 6/1962 | Vosbikian et al. | 74—89.15 X |
| 3,158,084 | 11/1964 | Cohn | 99—297 |

FOREIGN PATENTS

| | | |
|---|---|---|
| 693,951 | 7/1940 | Germany. |
| 614,067 | 12/1960 | Italy. |

WALTER A. SCHEEL, *Primary Examiner.*
S. P. FISHER, *Assistant Examiner.*